(12) United States Patent
McClelland et al.

(10) Patent No.: US 7,573,985 B2
(45) Date of Patent: Aug. 11, 2009

(54) SYSTEMS AND METHODS FOR FACILITATING COMMUNICATIONS INVOLVING HEARING-IMPAIRED PARTIES

(75) Inventors: William A. McClelland, Cedar Rapids, IA (US); Steven C. Johnson, Bethesda, MD (US); Mark R. Logan, Marion, IA (US); Chris R. Heidelbauer, Marion, IA (US); Benjamin W. Dudley, Toddville, IA (US); Kurt P. Haldeman, Hiawatha, IA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 773 days.

(21) Appl. No.: 11/156,491

(22) Filed: Jun. 21, 2005

(65) Prior Publication Data

US 2006/0285652 A1  Dec. 21, 2006

(51) Int. Cl.
*H04M 11/00* (2006.01)
(52) U.S. Cl. ............ 379/52; 379/93.15; 379/90.01
(58) Field of Classification Search ............ 379/52, 379/93.15, 90.01; 370/352
See application file for complete search history.

(56) References Cited

U.S. PATENT DOCUMENTS

| | | | | |
|---|---|---|---|---|
| 6,389,114 | B1 * | 5/2002 | Dowens et al. | 379/52 |
| 6,683,937 | B1 * | 1/2004 | Watson et al. | 379/52 |
| 6,950,501 | B1 * | 9/2005 | Chaturvedi et al. | 379/52 |
| 7,099,440 | B2 * | 8/2006 | Michaelis | 379/52 |
| 2004/0111268 | A1 * | 6/2004 | Steel, Jr. | 704/271 |
| 2005/0094776 | A1 * | 5/2005 | Haldeman et al. | 379/52 |
| 2005/0190893 | A1 * | 9/2005 | Stephens et al. | 379/52 |
| 2006/0171510 | A1 * | 8/2006 | Mundra et al. | 379/52 |

OTHER PUBLICATIONS

"ITU-T H.323: Packet-based multimedia communications systems", International Telecommunications Union, Jul. 2003.

* cited by examiner

*Primary Examiner*—Stella L Woo

(57) ABSTRACT

A method for providing communication services for the hearing-impaired may include receiving a telephone call from a hearing-impaired party or a hearing party. The method may also include forwarding the telephone call to a communication assistant and establishing a communication link, such an Internet protocol link, that links the hearing-impaired party, the communication assistant and the hearing party.

20 Claims, 5 Drawing Sheets

FIG. 4

| TELEPHONE NO. 410 | PREFERENCES/ORDER 420 | | | | | OTHER 430 |
|---|---|---|---|---|---|---|
| | VOIP 420-1 | VRS 420-2 | IM 420-3 | SMS 420-4 | TTY 420-5 | |
| 571-123-4567 | | | | | | BILL SMITH BSMITH1 |
| | | | | | | |
| | | | | | | |

330

SYSTEMS AND METHODS FOR FACILITATING COMMUNICATIONS INVOLVING HEARING-IMPAIRED PARTIES

FIELD OF THE INVENTION

The present invention relates generally to providing communication services and, more particularly, to providing communication services for hearing-impaired parties.

BACKGROUND OF THE INVENTION

A conventional telecommunication device for the deaf/teletype (TDD/TTY) enables people who are hearing-impaired or deaf to communicate with other parties via standard telephone lines. For example, one way in which a deaf party may communicate with another party is if both parties use a TDD/TTY. In this case, a calling party may type using a standard keyboard included with the TDD/TTY and the called party reads the message on a display associated with his/her TDD/TTY. The called party may similarly type a message using his/her TDD/TTY and the calling party may read the message using his/her display.

A second way in which a hearing-impaired/deaf person may communicate via standard telephone lines is referred to as relay. In this case, a hearing party wishing to communicate with a hearing-impaired party calls a designated telephone number associated with a relay service provider, typically an 800 number or a 711 number. The hearing party may then be connected to a communication assistant (CA) (also referred to as a relay operator). The CA may then ask the hearing party for the telephone number of the hearing-impaired party with whom he/she would like to communicate. The CA may then dial the telephone number of the hearing-impaired party, who may be using a TDD/TTY, and establish a connection with the hearing-impaired party. The CA may then type messages corresponding to messages voiced by the hearing party for display on the hearing-impaired party's TDD/TTY. The CA also sends voice messages corresponding to text typed by the hearing-impaired party. A similar process may occur when a hearing-impaired party wishes to initiate communications with a hearing party.

One problem with the methods described above is that the hearing party and the hearing-impaired party must communicate via conventional analog telephone lines. This limits the ability of hearing-impaired parties to communicate with others.

SUMMARY OF THE INVENTION

According to one aspect of the invention, a method for providing communication services is provided. The method includes receiving a request from a hearing-impaired party for establishing a communication link to a hearing party. The method also includes identifying a communication assistant and forwarding the request to the communication assistant. The method further includes establishing, by the communication assistant, a communication link from the hearing-impaired party to the hearing party using voice over Internet protocol (VoIP).

According to another aspect of the invention, a system including a server, an automatic call distributor and a first device is provided. The server is configured to receive a request from a hearing-impaired party or a hearing party for establishing a communication link between the hearing-impaired part and the hearing party. The automatic call distributor is configured to receive the request, identify a communication assistant and forward the request to the communication assistant. The first device is associated with the communication assistant and is configured to establish a conference call including the hearing-impaired party, the hearing party and the communication assistant using an Internet protocol.

In still another aspect of the invention, a method is provided that includes receiving a telephone call from a hearing-impaired party or a hearing party. The method also includes forwarding the telephone call to a communication assistant and establishing a VoIP communication link linking the hearing-impaired party, the communication assistant and the hearing party.

Other features and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

FIG. 4 illustrates an exemplary customer profile database.

DETAILED DESCRIPTION

Figure 1:
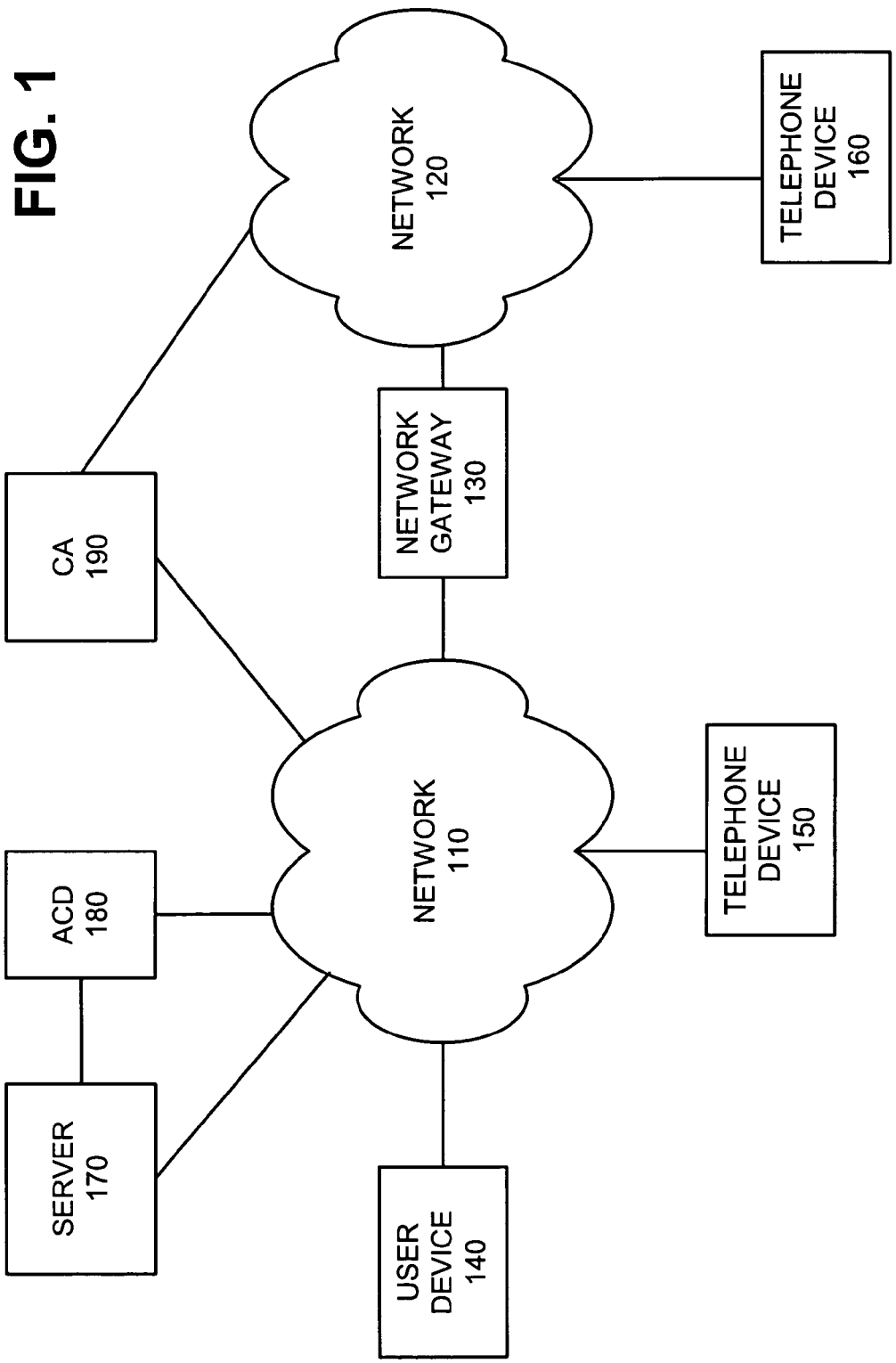
FIG. 1 is a diagram of an exemplary system in which methods and systems consistent with the present invention may be implemented.

FIG. 1 is a block diagram of an exemplary system 100 in which methods and systems consistent with the present invention may be implemented. System 100 includes networks 110 and 120, network gateway 130, user device 140, telephone devices 150 and 160, server 170, automatic call distributor (ACD) 180 and CA 190. The exemplary configuration illustrated in FIG. 1 is provided for simplicity. It should be understood that a typical system may include more or fewer devices than illustrated in FIG. 1. For example, a conference bridge device/platform that links multiple parties in a conference call and the associated analog and/or digital telephone circuits, switching devices, software or hardware controlled devices, etc., involved in completing the conference call may be included in system 100. These devices may be used to facilitate communications involving a hearing-impaired party, a CA and a hearing party. In addition, multiple ACDs 180 and multiple CAs 190 may be included in system 100.

Network 110 may include one or more packet switched networks, such as the Internet, an intranet, a local area network (LAN), a wide area network (WAN), or another type of network that is capable of transmitting data from a source device to a destination device. Network 110 may also include one or more wireless networks and may include a number of transmission towers for receiving wireless signals and forwarding the wireless signals toward the intended destination.

Network 120 may include one or more public switched telephone networks (PSTNs) or other type of switched network. Network 120 may also include one or more wireless networks.

Network gateway 130 may include one or more devices that allow divergent transport networks to communicate and cooperatively carry traffic. For example, network gateway 130 may provide for interoperation at two levels, e.g., between different signaling schemes and between different media forms. For example, network gateway 130 may adapt between SS7 signaling of network 120 and session initiation protocol (SIP) or H.323 protocols used by network 110. Network gateway 130 may also adapt analog or pulse code modulation (PCM) encoded voice signals to a packetized data stream suitable for transport over network 110.

User device 140, consistent with the present invention, may include any device that is able to transmit and/or receive Internet protocol (IP) based data. For example, user device 140 may include a personal computer (PC), a laptop, a personal digital assistant (PDA) or a web-based appliance that is able to transmit and receive IP data via a network, such as network 110. The IP data may include text data, video or image data, email data, voice data, etc. In an exemplary implementation, user device 140 may transmit voice data via network 110 using voice over Internet protocol (VoIP). For example, user device 140 may be a SIP-based telephone device or another VoIP-based telephone device. In either case, the telephone device may take the form of a standalone device, e.g., a SIP telephone, designed and configured to function and appear like a conventional telephone. A SIP-based telephone device may also include a software client that may run, for example, on a conventional PC, laptop computer or other computing device. User device 140 may also include any wireless device, such as a cellular telephone, a PDA or a pager that executes a wireless application protocol (WAP), or another protocol, that enables user device 140 to transmit and receive text and/or voice data via network 110.

Telephone device 150 may include any type of device that is capable of transmitting and receiving voice signals to/from a data network, such as network 110. For example, telephone device 150 may include any client, such as a computer device, a web-based appliance, etc., that is configured to provide telephone functions. Telephone device 150 may, for example, be a SIP-based telephone device or another VoIP-based telephone device. In either case, the telephone device may take the form of a standalone device, e.g., a SIP telephone, designed and configured to function and appear like a conventional telephone.

Telephone device 160 may include any conventional telephone, such as those used by a hearing party, that interfaces with the PSTN to place and receive telephone calls. Telephone device 160 may be a standard telephone, a cordless telephone, a cellular telephone or any other type of conventional telephone. Telephone device 160 may also include a conventional plain old telephone system (POTS) phone with a text screen to display text messages Server 170 may include any server/computing device that is able to connect to network 110 and transmit and receive data via network 110. Server 170 may include a firewall (not shown) that provides security-related services for server 170. Server 170 may also include a gateway (not shown) that supports persistent, full duplex transmission control protocol (TCP)/Internet Protocol (IP) connections between server 170 and other devices in system 100, such as user device 140, ACD 180 and CA 190. For example, the gateway may include one or more call processors that enable a client application programming interface (API) to maintain a persistent socket connection between a client application executed by user device 140 and server 170 and/or CA 190. Server 170, as described in more detail below, enables a hearing-impaired user to establish communications with a CA to facilitate communications with a desired party.

ACD 180 may include any automatic call distributor that receives telephone calls forwarded by server 170, such as telephone calls received from a number of user devices (e.g., user device 140). ACD 180 may then forward the call to an appropriate destination, such as a CA (e.g., CA 190). ACD 180 may interface with any number of different types of CA systems/consoles.

CA 190 may represent any conventional CA workstation/ computer and operator used to facilitate communications between a hearing-impaired party and a hearing party. CA 190 may include a workstation or computer, such as a personal computer or laptop. CA 190, consistent with the present invention, may also include any device capable of performing IP based messaging, such as VoIP, to transmit voice and/or text via network 110. CA 190 may be used in any telerelay services (TRS) environment, such as a voice carry over (VCO) environment, a hearing carry over (HCO) environment, a speech-to-speech (STS) environment, etc. CA 190, consistent with the present invention, may be coupled to networks 110 and 120 to facilitate communications with both hearing-impaired parties and hearing parties.

In an exemplary implementation consistent with the invention, CA 190 may include a voice recognizer that performs voice or speech recognition. The voice recognizer may include software and/or hardware that is able to automatically convert received voice data into text. The operator associated with CA 190 may merely edit the output of the voice recognizer in situations where the voice recognizer does not accurately generate the text output. For example, if the operator at CA 190 notices that the output of the voice recognition process does not accurately reflect what was voiced, CA 190 may retype all or a portion of the text to reflect what was actually voiced before the text is transmitted to the particular terminating device where the text will be displayed.

CA 190 may also include a high speed text input device, such as a stenographic device, a communication access real-time translation (CART) device, etc. These high speed text input devices may enable an operator at CA 190 to keep up with a conversation between a hearing party and a hearing-impaired party.

CA 190 may also include any conventional telephone (not shown), such as one used by a hearing party, that interfaces with the PSTN to place and receive telephone calls. For example, the telephone device may be a standard telephone, a cordless telephone, a cellular telephone or any other type of conventional telephone. The telephone device may also include any type of device that is capable of transmitting and receiving voice signals to/from a data network. For example, the telephone device may include any client, such as a computer device, a web-based appliance, etc., that is configured to provide telephone functions. The telephone device may, for example, be a SIP-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional PC, laptop computer or other computing device.

In an exemplary implementation consistent with the invention, server 170, ACD 180 and CA 190 enable a hearing-impaired party to communicate with a hearing party via VoIP. Server 170 and CA 190 are illustrated in FIG. 1 as being connected via ACD 180 and network 110. In alternative implementations, server 170, ACD 180 and CA 190 may be connected directly to each other, connected via a LAN, connected via a private network, etc. In still other alternative implementations, the functions performed by server 170 and ACD 180, described in more detail below, may be performed by a single device/platform. In still further alternative implementations, the functions performed by server 170, ACD 180 and CA 190 may be performed by a single device platform.

Figure 2:
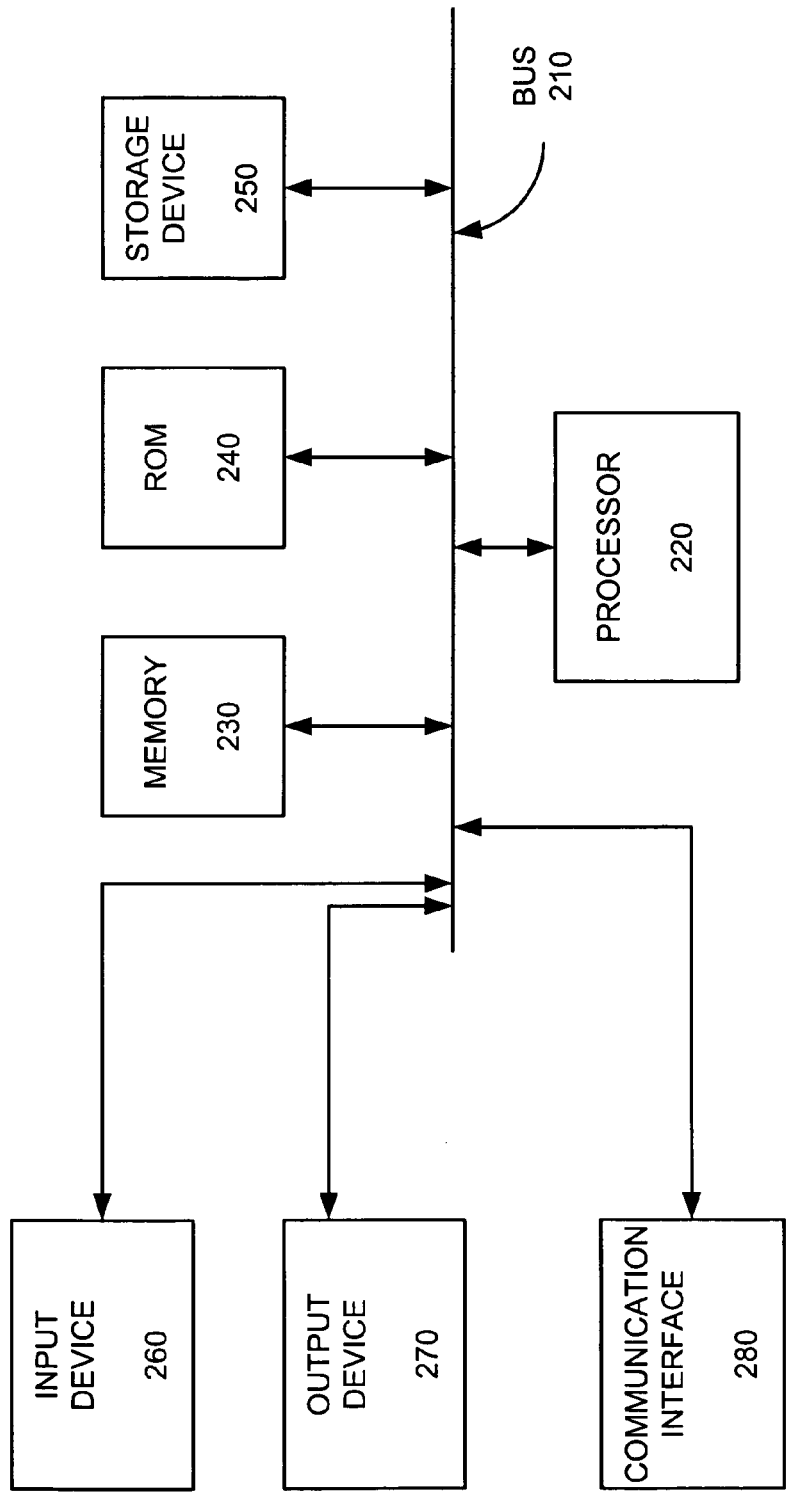
FIG. 2 is an exemplary block diagram of the server and CA of FIG. 1.

FIG. 2 illustrates an exemplary configuration of each of server 170 and CA 190 in an implementation consistent with the invention. Other configurations may alternatively be used. Server 170/CA 190 may include a bus 210, a processor 220, a memory 230, a read only memory (ROM) 240, a storage device 250, an input device 260, an output device 270, and a communication interface 280. Bus 210 permits communication among the components of server 170/CA 190.

Processor 220 may include any type of conventional processor or microprocessor that interprets and executes instructions. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a conventional ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions.

Input device 260 may include one or more conventional mechanisms that permit an operator to input information to server 170/CA 190, such as a keyboard, a mouse, a pen, voice recognition and/or biometric mechanisms, etc. Output device 270 may include one or more conventional mechanisms that output information to the operator, including a display, a printer, one or more speakers, etc. Communication interface 280 may include any transceiver-like mechanism that enables server 170/CA 190 to communicate with other devices and/or systems. For example, communication interface 280 may include a modem or an Ethernet interface to a LAN. Alternatively, communication interface 280 may include other mechanisms for communicating via a network.

Server 170, consistent with the present invention, provides a platform through which user device 140 may establish communications with CA 190. CA 190, consistent with the present invention, provides a platform through which a hearing-impaired party at user device 140 may communicate with a party at telephone device 150 or telephone device 160. According to an exemplary implementation, server 170/CA 190 may perform various processes in response to processor 220 executing sequences of instructions contained in memory 230. Such instructions may be read into memory 230 from another computer-readable medium, such as storage device 250, or from a separate device via communication interface 280. It should be understood that a computer-readable medium may include one or more memory devices or carrier waves. Execution of the sequences of instructions contained in memory 230 causes processor 220 to perform the acts that will be described hereafter. In alternative embodiments, hard-wired circuitry may be used in place of or in combination with software instructions to implement the present invention. Thus, the present invention is not limited to any specific combination of hardware circuitry and software.

Figure 3:
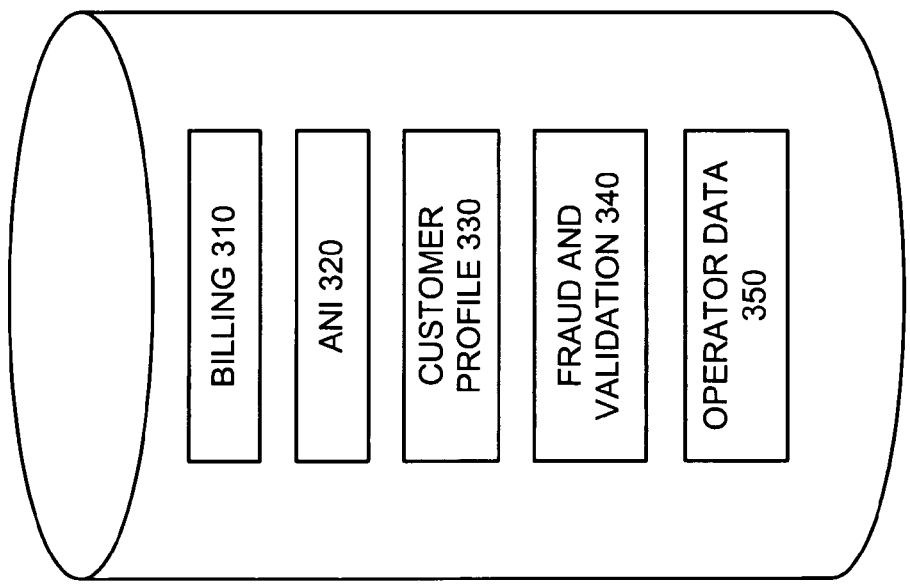
FIG. 3 illustrates exemplary databases that may be stored on the server of FIG. 1 or are accessible by the server of FIG. 1.

FIG. 3 illustrates an exemplary group of databases 300 that may be used in implementations consistent with the invention. In an exemplary embodiment, databases 300 are stored in server 170, such as in storage device 250 (FIG. 2). Alternatively, databases 300 may be located externally from server 170. Databases 300, consistent with the invention, include a billing database 310, an automatic number identification (ANI) database 320, a customer profile database 330, a fraud and validation database 340 and an operator data database 350. Other databases may also be included in databases 300.

Billing database 310 may store information associated with calls made to/from user device 140. For example, billing database 310 may store charges associated with long distance calls made by a party at user device 140.

ANI database 320 may store names and other information corresponding to telephone numbers associated with user device 140 and telephone devices 150 and 160. For example, ANI database 320 may store a telephone number associated with user device 140 and a name and other information associated with the party to whom the telephone number has been assigned. Such information may facilitate assigning a CA to service a call from user device 140 and also facilitate communications involving a hearing-impaired party at user device 140. For example, the ANI database 320 may indicate that the party at user device 140 speaks Spanish. ACD 180 may use this information to identify an appropriate CA to handle calls from user device 140. For example, server 170 may identify a telephone number associated with a call from user device 140 using an ANI process. Server 170 may forward the identified telephone number to ACD 180, which may then access ANI database 320 to identify any particular requirements associated with user device 140.

Customer profile database 330 may include information associated with a hearing-impaired party at user device 140. In an exemplary implementation, customer profile database 330 may include information identifying one or more methods by which the hearing-impaired party at user device 140 would like to communicate.

For example, a number of different methods or services associated with communications involving hearing-impaired parties may be available. These services may include, for example, a number of methods of communicating via the Internet, referred to herein as Internet protocol (IP) relay. IP relay may allow a hearing-impaired party to receive text and/or voice messages via any computer device, PDA, wireless device, etc. IP relay may include a number of individual types of communications, such as VoIP, video relay service (VRS), short message service (SMS), instant messaging, email, etc. Other types of services that may be available include paging, TDD/TTY, telephone with text display, etc. These services will be described briefly below. It should be understood that additional methods/services may also be used to facilitate communications involving hearing-impaired parties, such as other Internet related communication methods. Server 170 may provide a list of methods/services available for selection by hearing-impaired parties via a user interface provided to hearing-impaired parties. Alternatively, an operator associated with server 170 may receive selections from hearing-impaired parties over the telephone. For example, a hearing-impaired party or a party affiliated with a hearing-impaired party may contact an operator associated with server 170 and may provide the preferred methods/services by which the hearing-impaired party wishes to communicate. The preferred methods/service information may be communicated to the operator via telephone, email or any other convenient method. The operator may then enter this information into server 170 (e.g., customer profile database 330).

IP relay as discussed above may include a VoIP service. VoIP is a service used in a VCO environment in which the hearing-impaired party's voice is of sufficient clarity to be understood by others. In a VCO environment, therefore, the hearing-impaired party's voice messages may be transmitted directly to the hearing party without re-translation by a CA. In the VoIP service, the hearing-impaired party's voice may be transmitted to the terminating party using VoIP, as described in more detail below.

VRS is a service that allows a hearing impaired party to communicate with other parties using sign language. For example, a hearing-impaired party and a CA may be coupled via a high speed Internet link that allows each party having a camera to transmit video images over the high speed link. The hearing-impaired party may then send sign language images to a video interpreter (i.e., the operator) at CA 190. The operator at CA 190 may receive the video images and voice a message to the hearing party corresponding to the received sign language images. The operator at CA 190 may also translate the hearing party's voice messages to sign language and transmit the sign language images to the hearing-impaired party via the video link. In VRS, the hearing-impaired party at user device 140 and the operator at CA 190 may communicate via, for example, H.323, SIP or another protocol.

In an alternative implementation associated with VRS, if the hearing-impaired party at user device 140 has an adequate speaking voice, but is unable to transmit images to CA 190, VRS may operate in conjunction with VoIP. In this case, the hearing-impaired party's voice is transmitted to the terminating party without retranslation by the operator at CA 190. The operator at CA 190, however, receives voice input from the hearing party and transmits sign language images corresponding to the voice input for transmission via the video link to the hearing-impaired party at user device 140. In this case, since video images are not transmitted from user device 140 to CA 190, an Internet/web-based streaming video protocol may be used to display the video, as opposed to using, for example, an H.323 or SIP protocol. This enables CA 190 to communicate via video with a large number of user devices that do not support H.323 or SIP protocols.

In another implementation associated with VRS, avatars or animated figures may be used to provide sign language images to the hearing-impaired party. In this case, a received data stream (e.g., audio) may be converted into a text stream and input into an avatar signing device/program that converts the text into avatars (e.g., animated images) that display sign language images corresponding to the received data stream. Alternatively, the audio stream may be input directly into the avatar signing device/program. In either case, the output of the avatar signing device/program is images performing sign language, where the sign language images represent the same information as that which would result if a live signing interpreter was used. Advantageously, the avatar signing device/program may eliminate the need for an operator capable of signing. In addition, avatars require less bandwidth than full live video and may also be useful when the hearing-impaired party's user device (e.g., user device 140) is unable to view live video.

SMS is a service that allows a hearing-impaired party to receive and send short text messages via a wireless device, such as a cellular telephone or PDA. Using SMS, the operator at CA 190 may transmit SMS messages that correspond to voice messages from a hearing party for display on the hearing-impaired party's wireless device. The hearing-impaired party may also transmit SMS messages to the operator at CA 190, who relays voice messages corresponding to the SMS messages. Alternatively, the hearing-impaired party may voice messages which may be transmitted to the terminating party.

Instant messaging is a service that utilizes conventional instant messaging software, such as AOL Instant Messenger (AIM), Microsoft Messenger, etc., to transmit the text messages. One or more bots (not shown in FIG. 1) may be located in system 100 and may be used to facilitate communication between the hearing-impaired party at user device 140 and CA 190 via instant messages (IMs). For example, user device 140 may connect to a bot via network 110. The bot may receive communications from a number of user devices, such as user device 140, wishing to communicate with a CA via IMs. The bot may forward these requests via network 110 to an appropriate CA, such as CA 190. The bot may, for example, be implemented in server 170 or elsewhere in system 100 that is accessible to network 110. The operator at CA 190 may then receive IMs from the hearing-impaired party and voice the corresponding message to the hearing party. The operator at CA 190 may also receive voice messages from a hearing party and type corresponding IMs for transmission to the hearing-impaired party.

Paging is a service that allows a hearing-impaired party to receive and send text messages via a pager device. Using paging, the operator at CA 190 may transmit messages that correspond to voice messages from a hearing party for display on the hearing-impaired party's pager. The hearing-impaired party may also transmit messages via the pager to the operator at CA 190, who relays voice messages corresponding to the pager messages.

TTY/TDD is a service that allows a hearing-impaired party to receive and send text messages via a conventional TTY/TDD.

Telephone with text display is a service that allows the hearing impaired party to receive phone calls via a conventional telephone with a text display. The telephone may be used for situations, such as VCO, where the hearing-impaired party can speak, but is unable to hear. In this case, the operator at CA 190 may type text messages corresponding to received voice messages for display on the text display associated with the hearing-impaired party's telephone. The hearing-impaired party may read the text message and voice a reply for transmission to the hearing party (without retranslation by the operator at CA 190). In this service, the telephone used by the hearing-impaired party may be a POTS telephone device, a VoIP-based telephone or another type of conventional telephone.

FIG. 4 illustrates an exemplary customer profile database 330. Referring to FIG. 4, customer profile database 330 includes a telephone number field 410, a preferences/order field 420 and other field 430. Telephone number field 410 may store telephone numbers assigned to user devices, such as user device 140. Preferences/order field 420 may store preferred methods via which the respective hearing-impaired parties corresponding to the telephone numbers in field 410 would like to communicate and an order associated with the particular methods.

For example, in customer profile database 330 illustrated in FIG. 4, preferences/order field 410 may store a number of sub-fields labeled 420-1 through 420-5. In the example illustrated in FIG. 4, fields 420-1 through 420-5 in the first entry in customer profile database 330 store VoIP, VRS, IM, SMS and TTY, respectively. This indicates that the hearing-impaired party at telephone number 571-123-4567 would most like to communicate via VoIP. If VoIP is unavailable for some reason, the party at telephone number 571-432-0802 would like to communicate via VRS, followed by IM, SMS and TTY, in that order. Therefore, the order associated with fields 420-1 through 420-5 may represent the most preferred communication method to the least preferred communication method for the hearing-impaired party.

Other field 430 may store additional information, such as the name associated with the hearing-impaired party associated with user device 140, an IM screen name associated with the hearing-impaired party, etc. For example, other field 430 in the first entry in FIG. 4, stores the name Bill Smith and the screen name BSMITH1.

Server 170, ACD 180 and/or CA 190 uses the information in database 330 when attempting to establish communications with the hearing-impaired party, as described in more detail below.

Referring back to FIG. 3, fraud and validation database 340 may store telephone numbers associated with fraudulent users. Fraud and validation database 340 may also store validation information that may be used to verify that the identity of the party at user device 140.

Operator data database 350 may store information associated with various CAs, such as CA 190. For example, operator data database 350 may store data associated with how many callers each particular operator has assisted, the length of each call, etc.

Databases 300 may be used to facilitate communications between hearing-impaired parties and hearing parties. Databases 300 may also be used to generate reports to enable the service provider associated with system 100 to obtain data associated with the use of system 100.

Exemplary Processing

Figure 5:
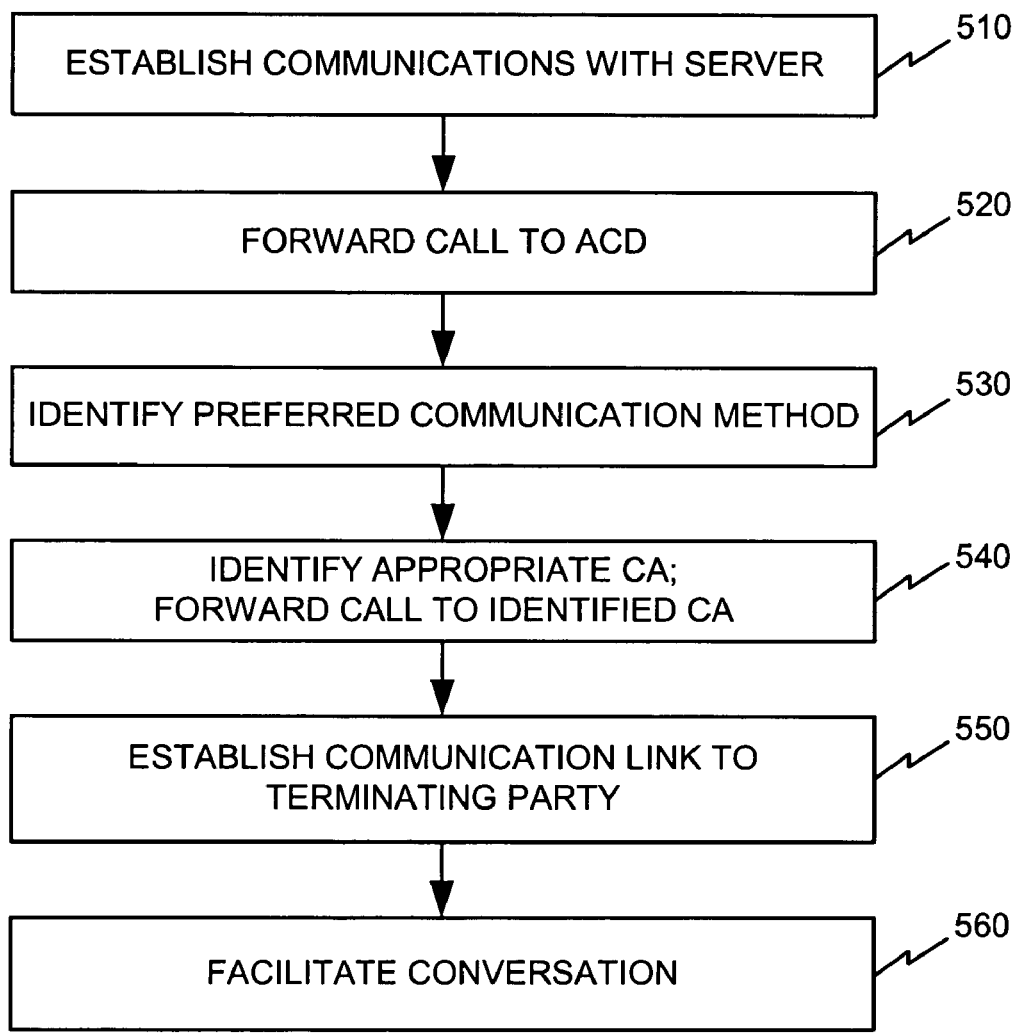
FIG. 5 illustrates exemplary processing associated with establishing communications between a hearing-impaired party and a hearing party.

FIG. 5 is an exemplary flow diagram, consistent with the invention, illustrating processing associated with establishing communications between a hearing-impaired party at user device 140 and a hearing party at telephone device 150 or 160. Processing may begin with a hearing-impaired party, such as a hearing-impaired party at user device 140, establishing communications with server 170 (act 510). For example, the hearing-impaired party may dial a telephone number associated with server 170 or enter an Internet address, such as a uniform resource locator (URL), associated with server 170 into a web browser being executed by user device 140.

Assume that the hearing-impaired party at user device 140 establishes communications with server 170 and that user device 140 is able to execute IP based messaging. For example, assume that user device 140 is a SIP-based telephone device or another device that is able to transmit and receive data using VoIP.

Server 170 receives the call and determines that the call is from a SIP-based telephone device. For example, server 170 may determine that user device 140 is a SIP-based telephone device based on the manner in which the actual call was received (e.g., received via an IP-based switch in network 110) and/or the protocol associated with the received call. Server 170 may forward the call to ACD 180 (act 520).

ACD 180 may access ANI database 320 and/or customer profile database 330 to identify any particular requirements associated with the caller at user device 140. For example, one or both of ANI database 320 and customer profile database 330 may identify language requirements associated with the hearing-impaired party at user device 140. ACD 180 may use this information to identify an appropriate CA to assist the caller.

ACD 180 may also access customer profile database 330 to identify the preferred method by which the hearing-impaired party (also referred to as the calling party in this example) wishes to communicate (act 530). For example, assume that the calling party has the telephone number 571-123-4567 (i.e., entry 1 in customer information database 330 in FIG. 4). The telephone number may be identified, for example, using ANI techniques. ACD 180 may then access customer profile database 330 and identify that the calling party at user device 140 would like to communicate via VoIP (i.e., field 420-1 in FIG. 4 corresponding to telephone number 571-123-4567). ACD 180 may then use this preference information to route the call to an appropriate CA.

For example, ACD 180 may identify a particular CA that is able to communicate with the calling party using the preferred communication method (act 540). For example, ACD 180 may search a table containing a list of CAs and their respective statuses. The status of each CA may indicate whether that particular CA is currently handling a call (e.g., involved in a conversation between a hearing-impaired party and a hearing party), is off-line/not available or is available to help a caller. The table may also include information indicating the particular types of calls that the CA can handle (e.g., VoIP calls, VRS calls, IM calls, TDD/TTY calls, etc.). The table may further include information regarding particular skills of the respective operators at each CA workstation, such as whether the operator speaks a foreign language (e.g., Spanish, French, etc.). The table may be stored, for example, in ACD 180 or in another device accessible by ACD 180. In the above example in which the calling party wishes to communicate via VoIP, ACD 180 identifies a CA that includes a workstation/platform capable of communicating via VoIP (e.g., a CA executing a VoIP client program).

Assume that CA 190 is executing a VoIP client program and that ACD 180 identifies CA 190 as the appropriate CA to handle the call from the calling party at user device 140. ACD 180 may then route the call to CA 190 (act 540).

The operator at CA 190 or an automated voice response unit at CA 190 may request that the hearing-impaired party at user device 140 identify a telephone number to which he/she would like to be connected. The hearing-impaired party may voice the terminating number or enter the terminating telephone number via a text input device. In this example, since the hearing-impaired party has selected VoIP as the preferred communication method, this means that the hearing-impaired party has adequate clarity in his/her speaking voice to be understood. Therefore, in this case, assume that the hearing-impaired party voices the terminating telephone number. The voiced terminating number may be transmitted to CA 190 over network 110 using VoIP. The operator at CA 190 may receive the terminating number and place the telephone call to the desired terminating telephone number.

Assume that the terminating telephone number is associated with telephone device 150 and that telephone device 150 is a SIP-based telephone. Further assume that a hearing party at telephone device 150 answers the call and a communications link between user device 140, CA 190 and telephone device 150 is established (act 550). The communications link may be a conference call/bridge in which all three parties (i.e., the hearing-impaired party at user device 140, CA 190 and the hearing party at telephone device 150) are linked in a full duplex mode which allows both voice and text to be simultaneously transmitted between the parties. The communication link may then be used to facilitate the "conversation" between the hearing-impaired party at user device 140 and the hearing party at telephone device 150.

For example, once the connection is established, the hearing party at telephone device 150 may answer the call from the hearing-impaired party. The hearing-impaired party at user device 140 may voice a message, such as "Hi Bill, this is Jim, how are you?" As discussed previously, the hearing impaired party's voice transmitted via user device 140 may be of a sufficient clarity to allow the hearing-impaired party to verbally communicate to a hearing party, without the assistance of CA 190. In an exemplary implementation, the voice data transmitted by the hearing-impaired party at user device 140 may be transmitted to telephone device 150 as VoIP data. In other words, the voice data may be transmitted end-to-end (originating party at user device 140 to terminating party at telephone device 150) as VoIP data, without requiring any conversion to analog data at either ACD 180 or CA 190. This is in contrast to conventional systems in which an ACD receives analog voice data, which is then forwarded to a CA 190 and/or a terminating party in analog form. In this manner, an end-to-end IP based conversation may proceed between the parties at user device 140 and telephone device 150.

The hearing party at telephone device 150 may then voice his response. CA 190 receives the response and types text corresponding to the voice response and transmits the text to user device 140 via network 110. The hearing-impaired party at user device 140 may then read the text on a display associated with user device 140. In this manner, CA 190 may facilitate a conversation between the hearing party and the hearing-impaired party using a full duplex, end-to-end IP (e.g., VoIP) system. The conversation between the hearing party at telephone device 150 and the hearing-impaired party at user device 140 may then proceed in this manner, with CA 190 acting to convert voice messages received from telephone device 150 into text messages for transmission over network 110 to user device 140.

In the event that the connection to the called party at user device 150 is not able to be established, (e.g., the called party at telephone device 150 was not able to receive the call or the VoIP software at telephone device 150 was not activated or functioning properly), CA 190 may attempt to establish a link via the next preferred method of communicating. That is, CA 190 may read the information in field 420-2 to identify the next preferred method of communicating (VRS in the example in FIG. 4).

In this case, CA 190 may attempt to establish a link to the terminating party using VRS. If CA 190 is unable to perform VRS services, ACD 180 may forward the call to another CA capable of handling VRS calls.

If the hearing party does not respond to the second preferred method, CA 190 (or another CA) may try the third preferred method by reading the information stored in field 420-3 and so on until a connection is established. If CA 190 is unable to establish a connection via any of the methods stored in database 330, CA 190 may inform the hearing-impaired party at user device 140 that the called party is not available. In some implementations, CA 190 may prompt the hearing-impaired party to leave a message for the hearing party and may save the message for retrieval by the hearing party. In this case, an indicator may be provided to the hearing party at telephone device 150 that a message has been saved.

A similar process may occur when a hearing party wishes to establish communications with a hearing-impaired party. For example, a hearing party may contact server 170 to establish communications with the hearing-impaired party at user device 140. ACD 180 may identify an appropriate CA and forward the connection from the hearing party to the CA. The CA may then retrieve the information stored in database 330 to identify the preferred communication method and attempt to establish a connection with user device 140. The hearing-impaired party via user device 140 and the hearing party at telephone device 150 may then communicate via, for example, VoIP, streaming text messages, video images, IMs, etc., with CA 190 acting as the conduit for the conversation between the hearing party at telephone device 150 and the hearing-impaired party at user device 140.

The connection between user device 140, CA 190 and telephone device 150, as described above, may be a persistent, full duplex link. As described herein, the term "persistent, full duplex" refers to a communication link that is always connected and allows both parties to simultaneously transmit information. Such links do not require either the hearing-impaired party or the party at the opposite end (e.g., an operator at CA 190) to press a "send" or "receive" button. Further, such full duplex links allow each party to view messages in a streaming manner as the messages are being typed in real-time or near real-time without waiting for the sending party to complete the message and press "send". This helps prevent the "conversation" between the hearing-impaired party at user device 140 and the operator at CA 190 from getting out of synchronization when communicating with each other. The full duplex link may be implemented using, for example, Java, C, C++ or another programming language.

Conclusion

Systems and methods described herein facilitate communications between hearing parties and hearing-impaired parties by allowing a hearing-impaired party to communicate with a hearing party using IP-based relay methods, such as VoIP or other IP-based relay methods. Systems and methods described herein also provide increased flexibility with respect to allowing hearing-impaired parties to communicate with other parties.

In this disclosure, there is shown and described preferred embodiments of the invention, but, as aforementioned, it is to be understood that the invention is capable of use in various other combinations and environments and is capable of changes or modifications within the scope of the inventive concept as expressed herein.

For example, the implementations described above focus on establishing communications between user device 140 and telephone device 150 utilizing VoIP. In other implementations, user device 140 may communicate with a conventional PSTN telephone device (e.g., telephone device 160). In this case, data may be transmitted via IP (e.g., VoIP) over a portion of the path from user device 140 to telephone device. For example, VoIP data from user device 140 may be transmitted via network 110 and converted into analog form by, for example, network gateway 130, for transmission to an analog telephone device, such as telephone device 160, via network 120.

It should also be understood that text, streaming video, images or other data may be transmitted in system 100 using an Internet or Internet-based protocol. In addition, switch control data may be transmitted to/from, for example, server 170, ACD 180 and/or CA 190 using an IP or IP-based protocol.

Further, voice recognition software may be used in one or more of the methods described above to automatically generate text messages based on the received voice messages and automatically send the text messages to the hearing-impaired party via a text messaging program. Further, text messages received by a CA in some implementations consistent with the invention may be automatically translated into voice messages using text-to-voice software. This may eliminate the need for a human operator at CA workstations.

Lastly, a series of acts has been described with respect to FIG. 5, the order of the acts may be varied in other implementations consistent with the present invention. Moreover, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method performed by a computer system for providing communication services, the method comprising:
   receiving a request from a hearing-impaired party for establishing a communication link to a hearing party;
   identifying, by a processor of the computer system, a preferred communication method associated with the hearing-impaired party;
   identifying, by the processor, a communication assistant capable of assisting the hearing-impaired party using the preferred communication method;
   forwarding the request to the communication assistant; and
   establishing, by the communication assistant, a communication link from the hearing-impaired party to the hearing party using voice over Internet protocol (VoIP).

2. The method of claim 1, further comprising:
   receiving, by the communication assistant, voice input from the hearing-impaired party transmitted via VoIP.

3. The method of claim 1, where the communication link links the hearing-impaired party, the communication assistant and the hearing party in a conference call arrangement, the method further comprising:
   forwarding audio from the hearing-impaired party to the hearing party over the communication link via VoIP.

4. The method of claim 1, where the request is associated with a telephone call received from the hearing-impaired party, the method further comprising:
   receiving the telephone call from the hearing-impaired party; and
   forwarding the telephone call to an automatic call distributor.

5. The method of claim 4, where the identifying a communication assistant comprises:
   identifying, by the automatic call distributor, a first communication assistant, and forwarding the call to the first communication assistant.

6. The method of claim 1, further comprising:
   storing at least one alternative method by which to communicate with the hearing-impaired party.

7. The method of claim 1, further comprising:
   transmitting VoIP data from the hearing-impaired party to the hearing party via the communication link without converting the VoIP data to analog data along a path from the hearing-impaired party to the hearing party.

8. The method of claim 1, further comprising:
   storing information identifying at least one method by which the hearing-impaired party wishes to communicate, and where the establishing comprises:
   using the stored information when establishing the communication link.

9. A system, comprising:
   a server to:
      receive a request from a hearing-impaired party or a hearing party for establishing a communication link between the hearing-impaired party and the hearing party;
   an automatic call distributor to:
      receive the request,
      access a database to identify a preferred method of communicating with the hearing-impaired party,
      identify a communication assistant capable of assisting the hearing-impaired party using the preferred method, and
      forward the request to the communication assistant; and
   a first device associated with the communication assistant, the first device to:
      establish a conference call including the hearing-impaired party, the hearing party and the communication assistant using an Internet protocol and the preferred method.

10. The system of claim 9, where the first device is further to receive audio transmitted by the hearing-impaired party via voice over Internet protocol (VoIP).

11. The system of claim 10, where the audio is transmitted via the conference call to the hearing party using VoIP.

12. The system of claim 9, further comprising:
    a database to:
       store a plurality of telephone numbers and methods associated with each of the plurality of telephone numbers, the methods associated with a particular phone number identifying a preferred order of methods by which a hearing-impaired party associated with the particular telephone number wishes to attempt to establish communications.

13. The system of claim 12, where a first one of the methods comprises voice over Internet protocol (VoIP).

14. The system of claim 9, wherein where when establishing the conference call, the automatic call distributor is further to:
    access the database to identify a second method of communicating with the hearing-impaired party when the automatic call distributor is unable to identify a communication assistant capable of assisting the hearing-impaired party using the preferred method or when the first device is unable to establish a conference with an identified communication assistant,
    identify a communication assistant capable of assisting the hearing-impaired party using the second method, and
    establish the conference call using the second method.

15. A system, comprising:
    means for receiving a request for establishing a link between a hearing-impaired party and a hearing party;
    means for identifying a preferred communication method associated with the hearing-impaired party,
    means for identifying a communication assistant capable of assisting the hearing-impaired party using the preferred communication method and capable of satisfying the request;
    means for forwarding the request to the identified communication assistant; and
    means for establishing the link, where the link is used to forward at least one of voice, video or text from the hearing-impaired party to the hearing party using the preferred communication method and an Internet protocol.

16. The system of claim 15, further comprising:
    means for storing a plurality of telephone numbers and at least one method associated with each of the plurality of telephone numbers, the at least one method corresponding to the preferred method associated with communicating with the hearing-impaired party.

17. The system of claim 15, further comprising:
means for transmitting voice over Internet protocol (VoIP) data from the hearing-impaired party to the hearing party via the link.

18. A method performed by a computer system, the method comprising:
receiving a telephone call from a hearing-impaired party or a hearing party;
identifying, by a processor of the computer system, a preferred communication method associated with the hearing-impaired party;
identifying, by the processor, a first communication assistant capable of assisting the hearing-impaired party using the preferred communication method;
forwarding the telephone call to a communication assistant; and
establishing, using the preferred communication method, a voice over Internet protocol (VoIP) communication link linking the hearing-impaired party, the communication assistant and the hearing party.

19. The method of claim 18, further comprising:
identifying an alternative communication method associated with the hearing-impaired party when the preferred method is not used.

20. The method of claim 18, further comprising:
forwarding the telephone call to an automatic call distributor; and
identifying, by the automatic call distributor, a first communication assistant, where the forwarding the telephone call to a communication assistant comprises:
forwarding the telephone call to the first communication assistant.

* * * * *